US012636994B1

(12) United States Patent
Poudrier

(10) Patent No.: US 12,636,994 B1
(45) Date of Patent: May 26, 2026

(54) CARGO TRANSFER SYSTEM

(71) Applicant: Alan S Poudrier, Niceville, FL (US)

(72) Inventor: Alan S Poudrier, Niceville, FL (US)

( * ) Notice: Subject to any disclaimer, the term of this patent is extended or adjusted under 35 U.S.C. 154(b) by 397 days.

(21) Appl. No.: 18/537,201

(22) Filed: Dec. 12, 2023

(51) Int. Cl.
| | |
|---|---|
| *B60R 9/06* | (2006.01) |
| *B60P 1/54* | (2006.01) |
| *B60P 1/64* | (2006.01) |
| *B60P 3/34* | (2006.01) |
| *B62D 33/02* | (2006.01) |

(52) U.S. Cl.
CPC .............. *B60P 3/34* (2013.01); *B60P 1/5457* (2013.01); *B60P 1/5471* (2013.01); *B60P 1/6427* (2013.01); *B60R 9/06* (2013.01); *B62D 33/02* (2013.01)

(58) Field of Classification Search
CPC .... B62D 33/00; B62D 33/02; B62D 33/0207; B62D 33/0222; B62D 33/08; B60R 5/04; B60R 5/041; B60R 9/06; B60P 1/003; B60P 1/52; B60P 1/5457; B60P 1/54714; B60P 5/427; B60P 3/42; B60P 3/423; B60P 3/38; B60P 7/02; B60P 7/08076; B60P 1/64; B60P 1/6427; B60P 7/0807; B60J 7/041; B60J 7/10; B60J 7/102; B60J 7/141; B60J 7/1607
USPC ....................................................... 296/37.6
See application file for complete search history.

(56) References Cited

U.S. PATENT DOCUMENTS

| | | | | | |
|---|---|---|---|---|---|
| 10,464,492 | B1 * | 11/2019 | Linn | ........................ | B60J 7/102 |
| 11,325,664 | B2 * | 5/2022 | Hanson | .................. | B62D 43/02 |
| 12,116,045 | B1 * | 10/2024 | Schibler | .................. | B60R 16/03 |
| 2002/0018707 | A1 * | 2/2002 | Rodriguez Navio | ... | B60P 3/423 |
| | | | | | 414/535 |
| 2006/0061116 | A1 * | 3/2006 | Haaberg | ..................... | B60P 3/14 |
| | | | | | 296/37.6 |
| 2006/0145502 | A1 * | 7/2006 | Pero | ........................ | B60P 1/003 |
| | | | | | 296/37.6 |
| 2007/0210599 | A1 * | 9/2007 | Arnold | .................... | B60P 1/003 |
| | | | | | 296/26.09 |
| 2012/0267913 | A1 * | 10/2012 | Ostberg | ............. | B62D 33/0273 |
| | | | | | 296/100.18 |
| 2013/0094930 | A1 * | 4/2013 | Kalergis | .................. | B60P 1/435 |
| | | | | | 296/183.1 |
| 2017/0129548 | A1 * | 5/2017 | Krishnan | ................ | B60R 9/065 |
| 2017/0361755 | A1 * | 12/2017 | Yilma | ....................... | B60P 7/08 |
| 2018/0037274 | A1 * | 2/2018 | Mathis | .................... | B60P 1/003 |
| 2018/0043810 | A1 * | 2/2018 | Adams | .................... | B60P 1/003 |
| 2020/0406986 | A1 * | 12/2020 | Sosnowich | ........ | B62D 33/0207 |
| 2020/0406990 | A1 * | 12/2020 | Gaughf, Jr. | .......... | B62D 35/007 |
| 2021/0031841 | A1 * | 2/2021 | Kananda | ............ | B62D 33/0207 |
| 2021/0114444 | A1 * | 4/2021 | Voegele | ..................... | B60J 7/04 |
| 2021/0129920 | A1 * | 5/2021 | Mansell | ............. | B62D 33/0207 |
| 2021/0394685 | A1 * | 12/2021 | Harel | .................... | B60P 1/6445 |

(Continued)

*Primary Examiner* — Gregory A Blankenship
(74) *Attorney, Agent, or Firm* — Peter Loffler

(57) ABSTRACT

A cargo movement system for a pickup truck uses a pair of coextensive longitudinal rails that are each attached to a side of the interior of a bed of a pickup so as to be coextensive with one another. Roller bearings are provided on each rail allowing that a carriage to roll longitudinally back and forth along these rails. Removable legs are attached to the carriage as it exits the bed of the truck to support the carriage above ground when not in the bed. A hoist is removably attachable to one side of the device in order to move relatively heavy or bulky items such as a removable roof of the vehicle.

16 Claims, 6 Drawing Sheets

(56) References Cited

U.S. PATENT DOCUMENTS

| | | | |
|---|---|---|---|
| 2022/0009421 A1* | 1/2022 | Mannone | B60R 9/065 |
| 2022/0324522 A1* | 10/2022 | Kiefer, IV | B62D 33/0207 |
| 2023/0249759 A1* | 8/2023 | Dylewski, II | B62D 33/0273 |
| | | | 296/26.08 |
| 2024/0051619 A1* | 2/2024 | Rutman | B60P 1/003 |
| 2024/0132164 A1* | 4/2024 | Dylewski, II | B62D 33/02 |
| 2024/0217592 A1* | 7/2024 | Dylewski, II | B62D 33/0207 |
| 2024/0270327 A1* | 8/2024 | Park | B60P 1/6427 |

* cited by examiner

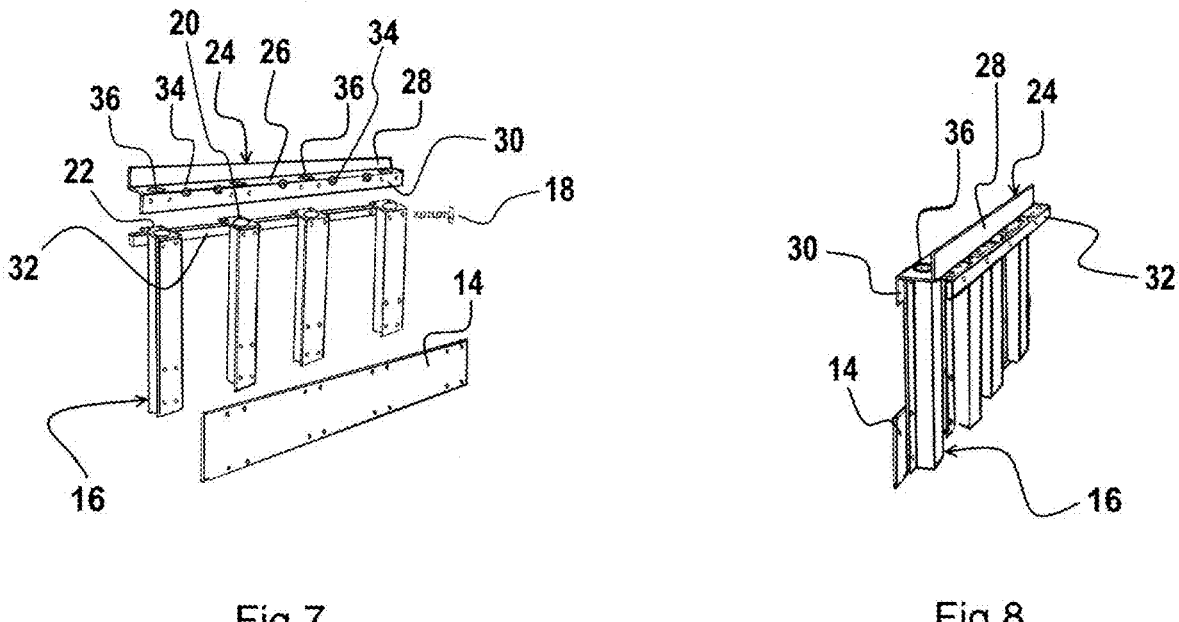
Fig 7                                    Fig 8
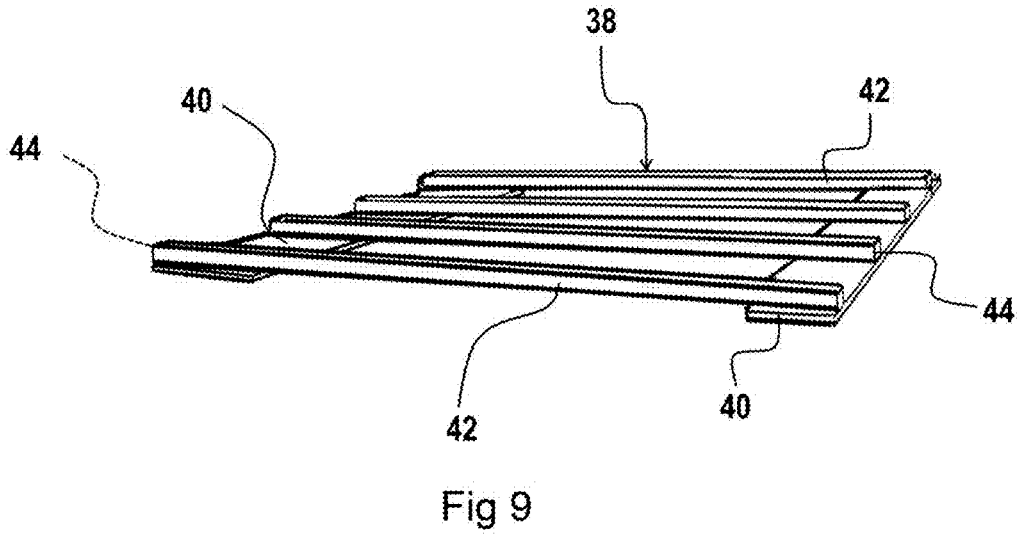
Fig 9

CARGO TRANSFER SYSTEM

BACKGROUND OF THE INVENTION

1. Field of the Invention

The present invention relates to vehicle bed installed framework system that facilitates the easy movement of cargo within the bed to a location external of the bed and also facilitates the removal of the vehicle's removable hardtop roof and transfer of the roof to a desired storage site as well as reversal of the process.

2. Background of the Prior Art

A current trend in primitive camping is to use the cargo bed of a pickup truck as a shelter base. A small, relatively simple rooftop tent is erected and secured to a cargo rack within the bed or within the bed proper of the pickup truck. By using the truck's bed as the base of their shelter, the users are off of the ground and are kept high and dry should the weather turn bad and keep Kenny the Cockroach is kept from making an unwanted, surprise visit during the night. The rooftop tents are relatively simple devices that are compact when in a stowed configuration so as to be easily transported. They are relatively simple to erect and install in position and secured to the truck.

While easy to deploy, rooftop tents still require effort to install onto the truck and remove from the truck. Therefore, when the user needs to use the truck for transport, such as running to the Food King for a beer run, the tent must be detached from the truck as the tent would get destroyed from the road wind if the tent remained in its installed position. The movement of the tent from the truck is accomplished in one of two ways. The tent is detached from its securement points on the truck and is lifted up and out of the bed area and placed onto a desired storage site. Upon return of the truck, the process is reversed so that the tent is moved back into its position within the truck bed and secured thereat. While most rooftop tents are relatively lightweight, they are a somewhat bulky due to their size and are typically moved by two people so as to minimize the risk of bending some of the tent's framework. As such, two people are needed to properly remove the tent from the truck and thereafter return the tent back onto the truck. When a person is camping solo, two people may not be readily available.

The other method to move the tent is to simply detach the tent from the truck, disassemble the tent and store the tent in a desired spot. Upon return of the truck to the campground, the tent is reassembled and reattached to the truck.

While neither method of tent removal from and replacement onto the truck is particularly arduous, each method requires time and effort and is considered a pain in the posterior.

Oftentimes, a user may simply forgo a trip in the truck in order to avoid the hassle of tent manipulation, especially if the user is tired.

What is needed is a system that allows for rapid removal of a rooftop tent from the bed of a pickup truck as well as rapid replacement of the tent back onto the bed of the truck. Such a system must be quick and easy to deploy and must be operable by a single person. Such a system must minimize the risk of damage to the tent during tent movement.

SUMMARY OF THE INVENTION

The cargo transfer system of the present invention addresses the aforementioned needs in the art by providing a system that is resident within the bed of a truck and that gives the user the ability to quickly and easily move a tent (or other cargo) between the bed of the truck and a location exterior of the bed of the truck. An optional storage subsystem can be used to hold the cargo exterior of the truck. The cargo transfer system can be single person operated and minimizes the risk of cargo damage during use. The cargo transfer system provides added functionality by being able to move the removable roof of a truck so equipped from the roof's position on the truck to a location remote of the truck and thereafter to replace the roof back onto the truck. Like moving the cargo between truck located and truck dislocated, the roof movement subsystem is quick and easy to deploy by a single person, all with minimum risk to the cargo being damaged.

The cargo transfer system of the present invention is comprised of a first of roller rail that secured to a first inner sidewall of a bed of a vehicle and a second roller rail that is secured to a second inner sidewall of the bed of the vehicle so that the first roller rail and the second roller rail are coextensive and parallel with one another and are located on the same plane. A first series of roller bearings is located on the first roller rail while a second series of roller bearings is located on the second roller rail, all roller bearings facing upwardly. A carriage has a first runner and a parallel second runner connected to the first runner by a series of cross rails. The carriage is positioned such that the first runner sits atop the first roller bearings of the first roller rail and the second runner sits atop the second roller bearings of the second roller rail so that the carriage slides back and forth along the first roller rail and the second roller rail. A first post extends downwardly from the first roller rail and is seated atop the bottom of the bed of the vehicle while a second post extends downwardly from the second roller rail and is also seated atop the bottom of the bed of the vehicle. The first post has a first hollow interior and an open top that is accessible via an opening located on the first roller rail. A hoist has a stem that is removably received within the hollow interior of the first post through the opening and the open top. The cross rails each have a first end with a hollow interior and an opposing second end with a hollow interior. A first leg is removably received within the hollow interior at the first end of the cross rail while a second leg is removably received within the hollow interior at the second end of the cross rail.

BRIEF DESCRIPTION OF THE DRAWINGS

FIG. 7 is an exploded environmental view of one of the subframes of the cargo transfer system.

FIG. 8 is a perspective view of one of the subframes of the cargo transfer system.

FIG. 9 is a perspective view of the carriage of the cargo transfer system.

Similar reference numerals refer to similar parts throughout the several views of the drawings.

DESCRIPTION OF THE PREFERRED EMBODIMENT

Figure 1:
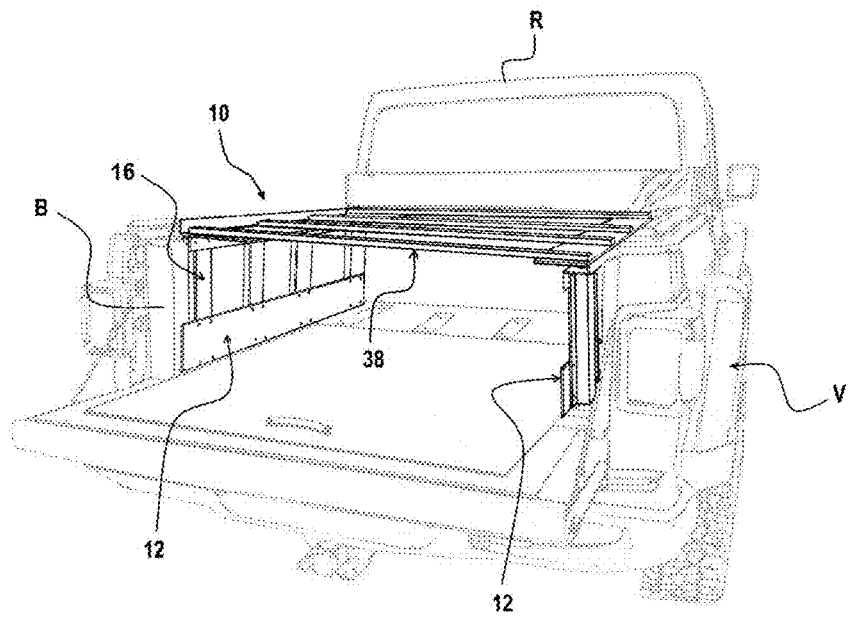
FIG. 1 is an environmental view of the cargo transfer system of the present invention installed within a bed of a pickup truck.
Figure 2:
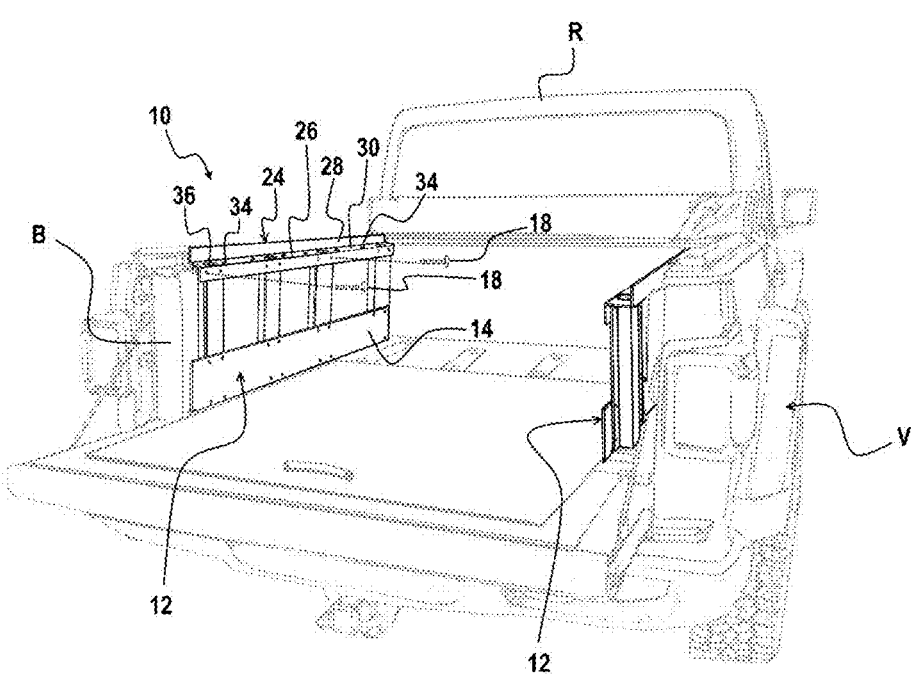
FIG. 2 is an environmental view of the cargo transfer system installed within the bed of the pickup truck with the carriage removed.
Figure 3:
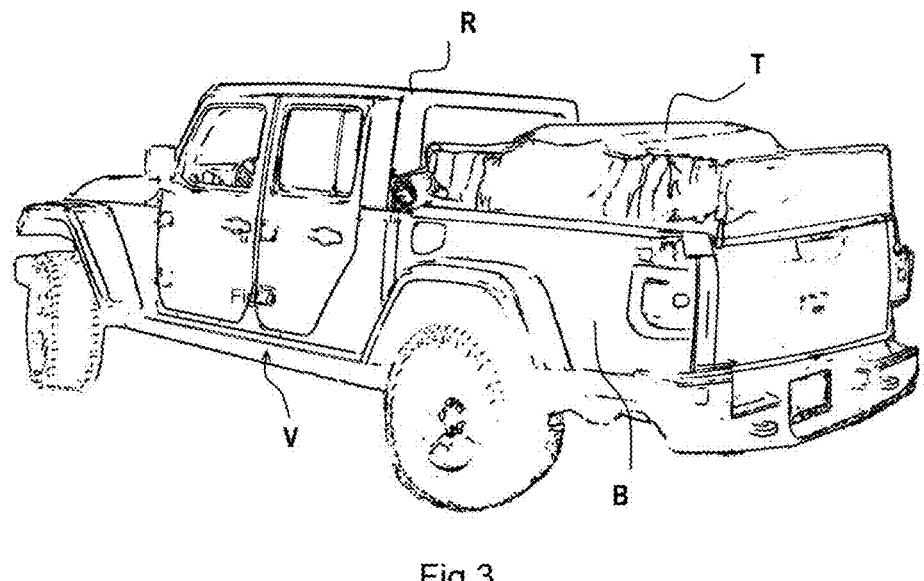
FIG. 3 is an environmental view of the cargo transfer system installed within the bed of the truck supporting a rooftop tent.
Figure 4:
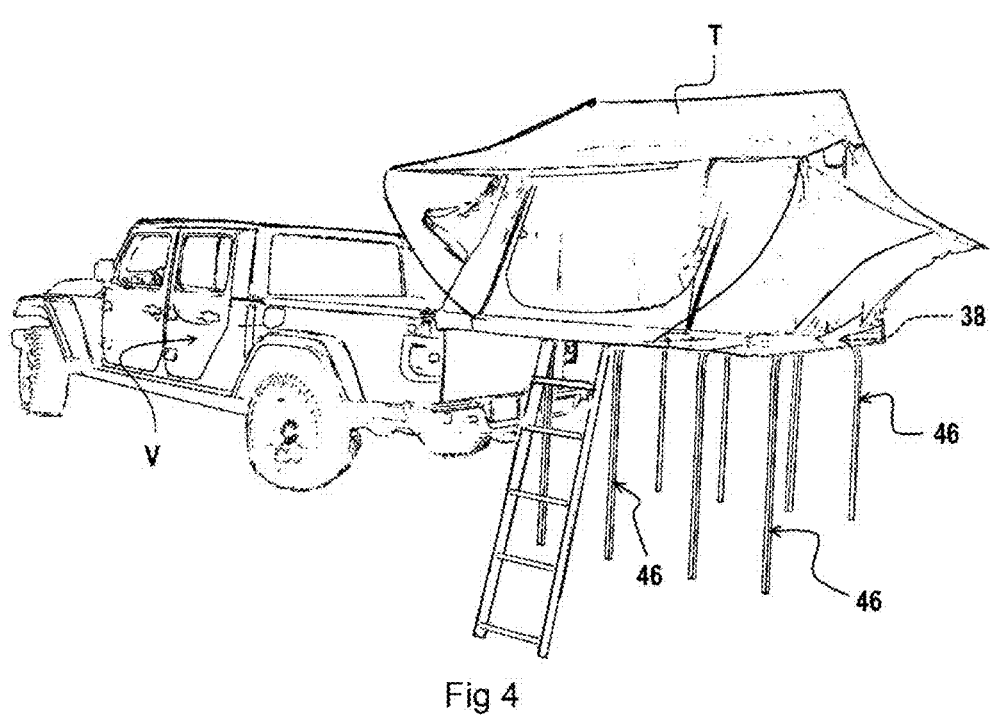
FIG. 4 is an environmental view of the cargo transfer system installed within the bed of the truck transferring the rooftop tent to the leg supported carriage.
Figure 5:
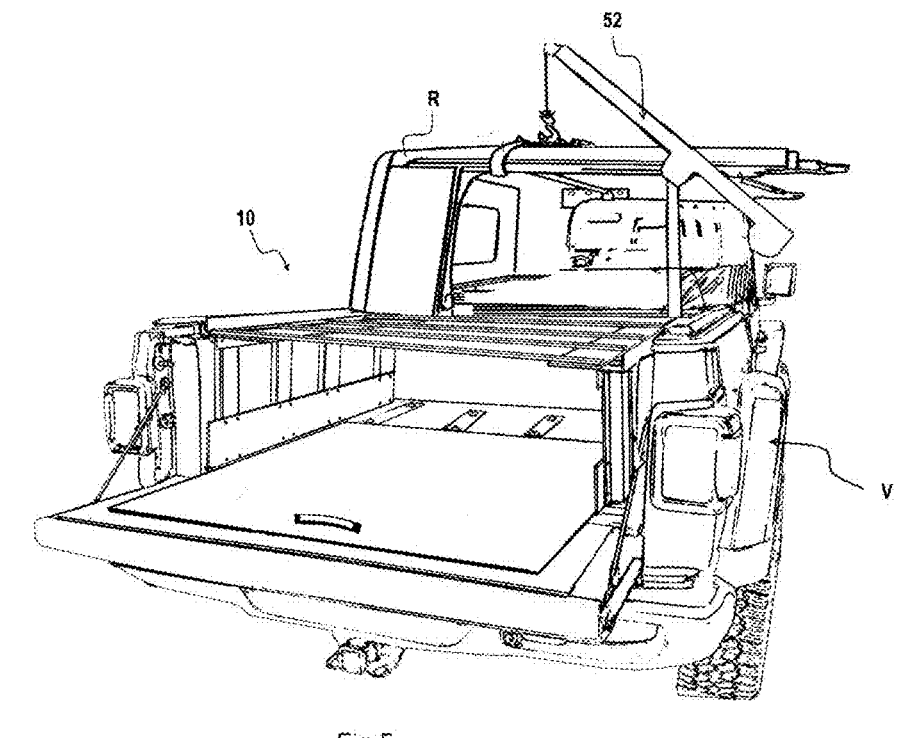
FIG. 5 is an environmental view of the cargo transfer system preparing to hoist and move a roof to the pickup truck.
Figure 6:
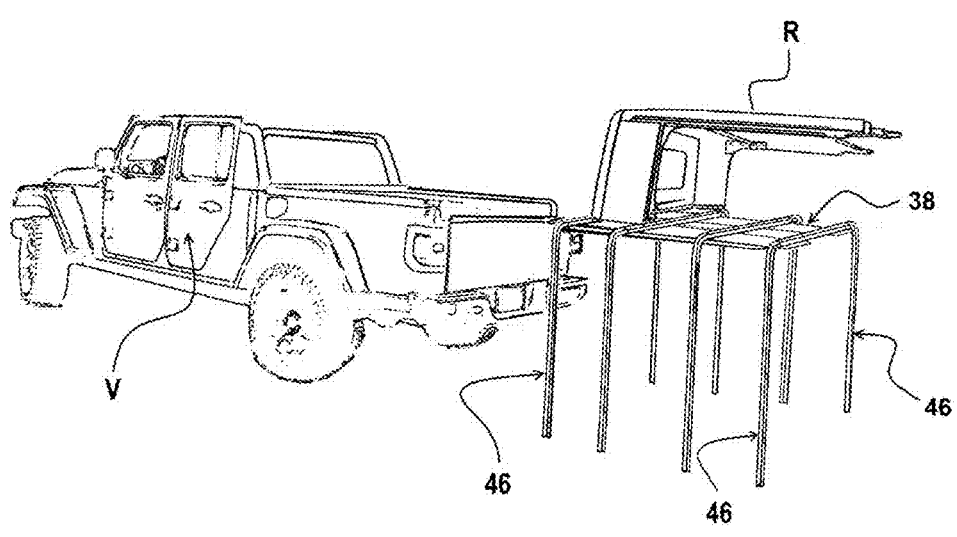
FIG. 6 is an environmental view of the cargo transfer system transferring the roof to the leg supported carriage.
Figure 10:
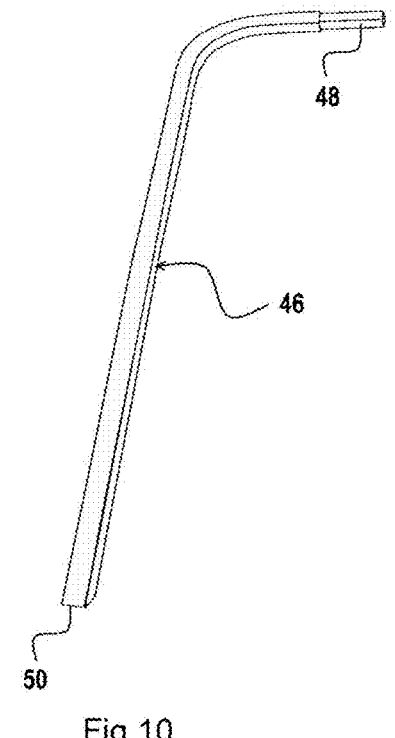
FIG. 10 is a perspective view of one of the legs of the cargo transfer system.
Figure 11:
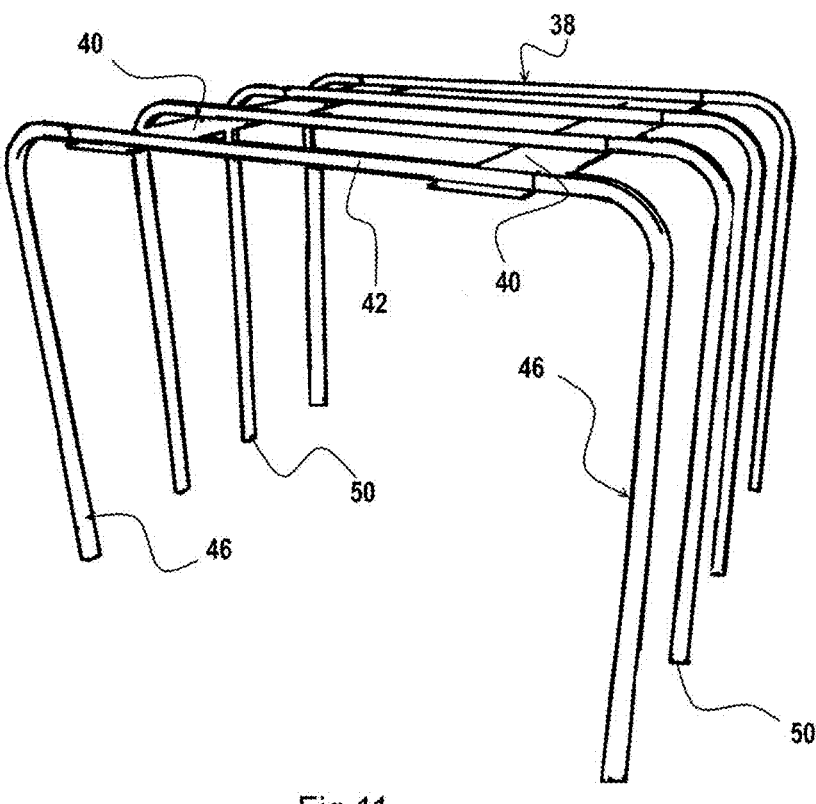
FIG. 11 is a perspective view of the carriage seated atop the legs.
Figure 12:
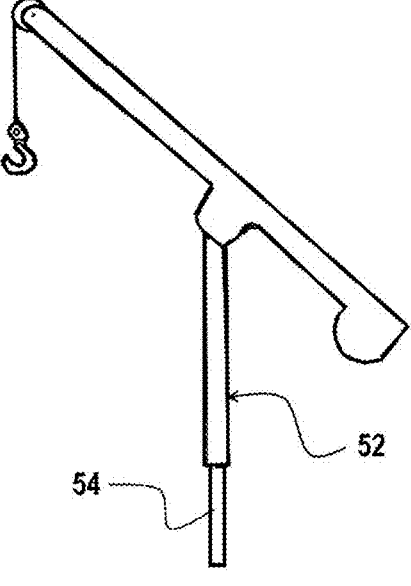
FIG. 12 is a perspective view of the hoist used with the cargo transfer system.

Referring now to the drawings, it is seen that the cargo transfer system of the present invention, generally denoted by reference numeral 10, is comprised of a pair of substantially similar frame members 12. Each frame member 12 has a lower frame rail 14 from which one or more vertical posts 16 extend upwardly, the lower frame rail 14 attached to each of the vertical posts 16 in appropriate fashion such as via the use of the illustrated screws 18 (including bolts), welding, etc. As seen, each vertical post 16 is a hollow tubular member that has an open top 20 and an attachment flange 22. An upper frame rail 24 is attached to each of the vertical posts 16. The upper frame rail 24 is comprised of a horizontally disposed roller rail 26 and a vertically disposed upper rail 28 extending upwardly from the distal side of the roller rail 26. A vertically disposed attachment rail 30 may extend downwardly from the proximal side of the roller rail 26. The upper frame rail 24 is attached to each of the vertical posts 16 in appropriate fashion such as by passing screws 18 through the attachment rail 30 and into the vertical posts 16 (assuring that the screws 18 do not pass into the hollow interior of the vertical posts 16), welding appropriate portions of the upper frame rail 24 to the attachment flanges 22 of the vertical posts 16 (attachment rail not necessarily needed), etc. The entire upper frame rail 24 can be formed as a single element. A securement rail 32 is attached to the vertical posts 16 proximate the transferring attachment flanges 22 thereof by passing screws 18 through the various attachment flanges 22 and the securement rail 32.

As seen, a series of roller bearings 34 of any appropriate design are located along the roller rail 26 facing upwardly in spaced apart fashion. An opening 36 is located on one or both of the roller rails 26 such that each opening 36 is aligned with the open top 20 of one of the vertical posts 16 in order to provide access to the hollow interior of the vertical posts 16 through the roller rail 26 as more fully discussed below.

A carriage 38 has a pair of runners 40 connected by one or more cross rails 42—the runners can be one overall sheet of material. Each of the cross rails 42 is a hollow tubular member, advantageously, although not necessarily with a non-round shaped hollow interior with both ends 44 open. A series of legs 46 each have a first end 48 that is dimensioned to be removably received within the hollow interior of one of the cross rails 42 through its open end 44. The legs 46 also have a second ground engaging end 50, which may have a pad (not illustrated). Although not illustrated, the legs can be telescoping.

The various components of the cargo transfer system 10 are made from an appropriate sturdy material such as aluminum, hard plastic, fiber composite, etc.

In order to use the cargo transfer system 10, each frame member 12 is positioned within the bed B of the pickup truck V and is seated on the bottom of the bed B via the vertical posts 16 so that each frame member 12 extends along the side of the bed. B. Each frame member 12 is secured to the bed B of a pickup truck V by passing appropriate screws (bolts) through the securement rail 32 and into the sidewalls of the bed B of the pickup truck V. Additional screws (bolts) can be passed through the lower frame rail 14 and into the bed B of the pickup truck V. Once each frame member 12 is so attached, the two roller rails 26 are coextensive and parallel with one another and lie on the same horizontal plane when the pickup truck V is gravitationally level. The carriage 38 is dimensioned so that each runner 40 sits on the roller bearings 34 of one of the roller rails 26 allowing the carriage 38 to longitudinally roll back and forth along the frame members 12 as desired. One or more appropriate catches (not illustrated) can be provided to hold the carriage 38 in a fixed position with respect to the frame members 12 and a stop (also not illustrated) can be provided to prevent the carriage 38 from rolling off the end of the roller rails 26. The carriage 38 can be used to move cargo, such as the illustrated tent T, into and out of the bed B of the pickup truck V with relative ease by simply sliding the cargo laden carriage 38 along the roller rails 26. When the carriage 38 is being slid out of the bed B of the pickup truck, as each cross rail 42 clears the frame member 12, the first end 48 of the legs 46 are inserted into the open ends of the cross rail 42, one leg 46 per side of a given cross rail 42, with the second end 50 of the legs 46 sitting on the ground. If the shape of the hollow interior of the cross rails 42 is non-round, then the legs 46 are positioned in matching engagement. If the shape of the hollow interior of the cross rails 42 is round, the legs 46 can be put in any desired position initially, then rotated within the hollow interior of the cross rail 42 to the leg's substantially vertical position when needed. An appropriate catch (not illustrated), such as a spring-loaded button system, pin. Etc., can be used to prevent rotation of the leg to hold the leg in this vertical position. As the carriage 38 proceeds to be removed from the bed B of the pickup truck V, additional legs 46 are attached to the cross rails 42 as the hollow interior of each cross rail 42 becomes accessible by the legs 46 until the carriage 38 is fully removed from the pickup truck V. In this way, the carriage 38 and its cargo are stored off of the pickup truck V on the carriage 38 with the carriage 38 supported off the ground via the legs 46, and the pickup truck V can go about its business. An appropriate securement system (not illustrated) can be provided to secure the carriage 38 onto the frame members 12, such as latches, a lip on each roller rail, catches, etc., in order to prevent the carriage 38 from flying off of the pickup truck V whenever the pickup truck V is traveling down the road.

If the roof R of the pickup truck V is to be removed, then the carriage 38 is removed from frame members 12 and a hoist 52 of any appropriate design has its stem 54 inserted into the hollow interior of one of the vertical posts 16 passing through the opening 36 of the roller rail 26 and the open top 20 of the vertical post 16. If the shape of the hollow interior of the vertical post 16 is round so that the corresponding shape of the stem 54 of the hoist 52 is also round, then the hoist 52 can be rotated as needed by simply twisting the stem 54 of the hoist 52 within the vertical post 16. If the shape of the hollow interior of the vertical post 16 is non-round, so that the corresponding shape of the stem 54 of the hoist 52 is also non-round (for better securement), then the hoist 52 provides its own rotation ability in appropriate fashion. The hoist 52 is used to lift the roof R of the pickup truck V in appropriate fashion and then transfer the roof R to a desired off-truck location such as onto the leg 46 supported carriage 38. Obviously, the hoist 52 can be used for movement of cargo that is completely exterior of the pickup truck V While the invention has been particularly shown and described with reference to an embodiment thereof, it will be appreciated by those skilled in the art that various changes in form and detail may be made without departing from the spirit and scope of the invention.

I claim:

1. A cargo mover for use with a vehicle, the vehicle having a bed with a bottom and a first inner sidewall and a coextensive second inner sidewall, the cargo mover comprising:

a first roller rail adapted to be secured to the first inner sidewall of the vehicle;

a second roller rail adapted to be secured to the second inner sidewall of the vehicle so that the first roller rail and the second roller rail are coextensive and parallel with one another and are located on the same plane;

a first series of roller bearings located on the first roller rail facing upwardly;

a second series of roller bearings located on the second roller rail facing upwardly;

a carriage having a first runner and a parallel second runner connected to the first runner by a series of cross rails, the carriage positioned such that the first runner sits atop the first roller bearings of the first roller rail and the second runner sits atop the second roller bearings of the second roller rail so that the carriage slides back and forth along the first roller rail and the second roller rail;

a first post extending downwardly from the first roller rail and adapted to be seated atop the bottom of the bed of the vehicle; and a second post extending downwardly from the second roller rail and adapted to be seated atop the bottom of the bed of the vehicle.

2. The cargo mover as in claim 1 wherein the first post has a first hollow interior and an open top that is accessible through an opening located on the first roller rail.

3. The cargo mover as in claim 2 further comprising a hoist having a stem, the stem removably received within the first hollow interior of the first post through the opening and the open top.

4. The cargo mover as in claim 3 wherein the cross rails each have a first end with a second hollow interior and an opposing second end with a third hollow interior.

5. The cargo mover as in claim 4 further comprising:

a first leg removably received within the second hollow interior of the cross rail; and a second leg removably received within the third hollow interior of the cross rail.

6. The cargo mover as in claim 2 wherein the cross rails each have a first end with a second hollow interior and an opposing second end with a third hollow interior.

7. The cargo mover as in claim 6 further comprising:

a first leg removably received within the second hollow interior of the cross rail; and a second leg removably received within the third hollow interior of the cross rail.

8. The cargo mover as in claim 1 wherein the cross rails each have a first end with a first hollow interior and an opposing second end with a second hollow interior.

9. The cargo mover as in claim 8 further comprising:

a first leg removably received within the first hollow interior of the cross rail; and a second leg removably received within the second hollow interior of the cross rail.

10. A cargo mover for use with a vehicle, the vehicle having a bed with a bottom and a first inner sidewall and a coextensive second inner sidewall, the cargo mover comprising:

a first roller rail adapted to be secured to the first inner sidewall of the vehicle;

a second roller rail adapted to be secured to the second inner sidewall of the vehicle so that the first roller rail and the second roller rail are coextensive and parallel with one another and are located on the same plane;

a first series of roller bearings located on the first roller rail facing upwardly;

a second series of roller bearings located on the second roller rail facing upwardly;

a carriage having a first runner and a parallel second runner connected to the first runner by a series of cross rails, the carriage positioned such that the first runner sits atop the first roller bearings of the first roller rail and the second runner sits atop the second roller bearings of the second roller rail so that the carriage slides back and forth along the first roller rail and the second roller rail; and wherein the cross rails each have a first end with a first hollow interior and an opposing second end with a second hollow interior.

11. The cargo mover as in claim 10 wherein the first post has a first hollow interior and an open top that is accessible through an opening located on the first roller rail.

12. The cargo mover as in claim 11 further comprising a hoist having a stem, the stem removably received within the first hollow interior of the first post through the opening and the open top.

13. The cargo mover as in claim 12 wherein the cross rails each have a first end with a second hollow interior and an opposing second end with a third hollow interior.

14. The cargo mover as in claim 12 further comprising:

a first leg removably received within the second hollow interior of the cross rail; and a second leg removably received within the third hollow interior of the cross rail.

15. The cargo mover as in claim 11 wherein the cross rails each have a first end with a second hollow interior and an opposing second end with a third hollow interior.

16. The cargo mover as in claim 15 further comprising:

a first leg removably received within the second hollow interior of the cross rail; and a second leg removably received within the third hollow interior of the cross rail.

* * * * *